United States Patent
Shahid et al.

(10) Patent No.: US 7,907,558 B2
(45) Date of Patent: Mar. 15, 2011

(54) METHOD FOR PROVIDING A MULTICAST SERVICE WITHIN A WIRELESS COMMUNICATIONS SYSTEM

(75) Inventors: Malek Shahid, Wiltshire (GB); Louis Gwyn Samuel, Wiltshire (GB); Gerhard Helmut Hertlein, Hoechstadt (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1095 days.

(21) Appl. No.: 11/262,485

(22) Filed: Oct. 28, 2005

(65) Prior Publication Data

US 2007/0097932 A1 May 3, 2007

(51) Int. Cl.
*H04H 20/71* (2008.01)
(52) U.S. Cl. .................................. 370/312; 342/463
(58) Field of Classification Search .............. 370/312, 370/338; 342/463; 455/550.1; 709/245
See application file for complete search history.

(56) References Cited

U.S. PATENT DOCUMENTS

| | | | |
|---|---|---|---|
| 2002/0105950 A1* | 8/2002 | Dapper et al. | 370/386 |
| 2003/0026240 A1* | 2/2003 | Eyuboglu et al. | 370/349 |
| 2003/0220119 A1* | 11/2003 | Terry | 455/466 |
| 2003/0223393 A1* | 12/2003 | Lee | 370/335 |
| 2005/0075124 A1* | 4/2005 | Willenegger et al. | 455/522 |
| 2005/0144318 A1* | 6/2005 | Chang | 709/245 |
| 2007/0270135 A1* | 11/2007 | Gaschler | 455/414.3 |
| 2009/0005109 A1* | 1/2009 | Nishio et al. | 455/550.1 |

OTHER PUBLICATIONS

PCT Search Report from PCT/US2006/040687 dated Mar. 14, 2007.
Eusebio et al., "Management Scenarios for Multicast Groups in Enhanced-UMTS" *Vehicular Technology Conference*, 204 VTC2004-Fall. 2004 IEEE 60th Los Angeles, Ca. USA Sep. 26-29, 2004, Piscataway, NJ. USA, IEEE, Sep. 2004 pp. 3045-3047, Chapter "III. B Quality of Service Oriented Approach".

* cited by examiner

*Primary Examiner* — Dang T Ton
*Assistant Examiner* — Wei Zhao
(74) *Attorney, Agent, or Firm* — Williams, Morgan & Amerson

(57) ABSTRACT

In one aspect of the present invention, a method is provided for delivering multicast data to a plurality of mobile devices. The method comprises providing data using a first technique, such as multicast over HS-DSCH, to a first portion of the plurality of mobile devices, and providing data using a second technique, such as multicast over DCH or FACH, to a second portion of the plurality of mobile devices. The type of multicast technique used is based upon a quality of communications, such as the long term block error rate, that exists with respect to each of the mobile devices.

13 Claims, 3 Drawing Sheets

METHOD FOR PROVIDING A MULTICAST SERVICE WITHIN A WIRELESS COMMUNICATIONS SYSTEM

BACKGROUND OF THE INVENTION

1. Field of the Invention

This invention relates generally to telecommunications, and more particularly, to wireless communications.

2. Description of the Related Art

In the field of wireless telecommunications, new multicast services like video streaming, game delivery or news clips are becoming more and more popular on mobile handsets and user equipment (UE) like Personal Digital Assistants (PDAs) and notebooks. Release 6 of the Third Generation (3G) Universal Mobile Telecommunications System (UMTS) identifies an implementation of Multimedia Broadcast/Multicast Services (MBMS) that has focused on the use of transport channels between the Base Station Router (BSR) or Node B and the UE, using the Forward Access CHannel (FACH), Dedicated Channel (DCH) and Donlink Shared Channel (DSCH). In Release 5 and above, High Speed DSCH (HS-DSCH) has been shown to provide high-speed downlink connections for unicast users. While the HS-DSCH allows High Speed Downlink Packet Access (HSDPA) to increase peak data rates and mean throughput per user based on individual information flows (e.g., unicasting), it does not address what is believed to be a major application in 3G services—multicasting.

The benefit on system performance and capacity by the use of HS-DSCH for multicasting may be less than desired due to the fact that this implementation would be used for a unicast-like scheme where users are being sent the same packet of data by transmitting it a number of times either in the code or in the time domain (code division multiplexing or time division multiplexing).

HS-DSCH is shown to be an efficient mechanism for multicast services. With HS-DSCH's Incremental Redundancy (IR) mechanism, code/modulation schemes are selected aggressively since more redundancy can be added when needed. Moreover, the HS-DSCH also uses adaptive coding and modulation, fast scheduling and Hybrid Acknowledgement ReQuest (H-ARQ) combining of retransmissions to improve the overall average throughput. It is believed that these technologies will improve the MBMS services over that given by current MBMS services based on Re199/4 and Re16 solutions.

However, when multicast services are using Re199 or HS-DSCH mechanisms, the worst user remains the bottleneck of the system. Currently, all Re1.99/4 systems conservatively select the coding and/or modulation and transmit power parameters to satisfy the worse case user. This limits the multicast service capabilities that could be provided because of the compromise that needs to be made between individual service provision, multicast service provision and the management of cell resources. Thus, the Re199 based system will fix the coding and power, while the HS-DSCH system would adapt those parameters based on the feedback coming from the worst user. In particular, as the selected Transport Format and Resource Combination (TFRC) is based on the worst Channel Quality Information (CQI), of all users in this group, then CQI is equivalent to a Signal to Noise Ratio (SNR) proportional to $\min\{PL_1.X_1,K,PL_N.X_N\}$, where N is the number of users in the group, PL is the path loss and X is the probability distribution of the fast fading.

The mechanisms used in the 3GPP standard to support multicast to a group of users in the coverage area of a cell include:

The use of FACH;
The use of DCH; and
The use of MBMS.

Supporting multicast via DCH is costly. The same multicast channel has to be replicated by the number of users using the multicast service. For a large multicast population in a cell this then is very costly in terms of cell resource utilization. DCH based multicasting effectively becomes a unicast service and if there are many users in a given cell that use the same multicast service, then it would rapidly consume all of the cells resources.

Supplying multicast services via the FACH is an improvement over unicasting. Principally, the FACH transmission parameters are set to cover users at the very edge of the cell and usually will yield low bit rates. This means that the FACH has relatively high power compared to other channels. Moreover, when a multicast service requiring high bit rate is used over the FACH it would consume vast amounts of cell resource. So, for low bit rate multicast services the FACH may have limited applicability, but for higher bit rate services it is not. While the actual bandwidth that can be transmitted by the FACH can be high (approaching 2 Mb/s), unfortunately this may not be practically achieved. For example, studies have shown that to supply a 128 kb/s Multicast channel over the entirety of a cell would take upwards of 70% of the available channel. Thus, providing MBMS over FACH is inefficient and has limited practical use.

SUMMARY OF THE INVENTION

The present invention is directed to overcoming, or at least reducing, the effects of, one or more of the problems set forth above.

In one aspect of the present invention, a method is provided for providing data to a plurality of mobile devices. The method comprises providing data using a first technique to a first portion of the plurality of mobile devices, and providing data using a second technique to a second portion of the plurality of mobile devices.

BRIEF DESCRIPTION OF THE DRAWINGS

The invention may be understood by reference to the following description taken in conjunction with the accompanying drawings, in which like reference numerals identify like elements, and in which.

Figure 1:
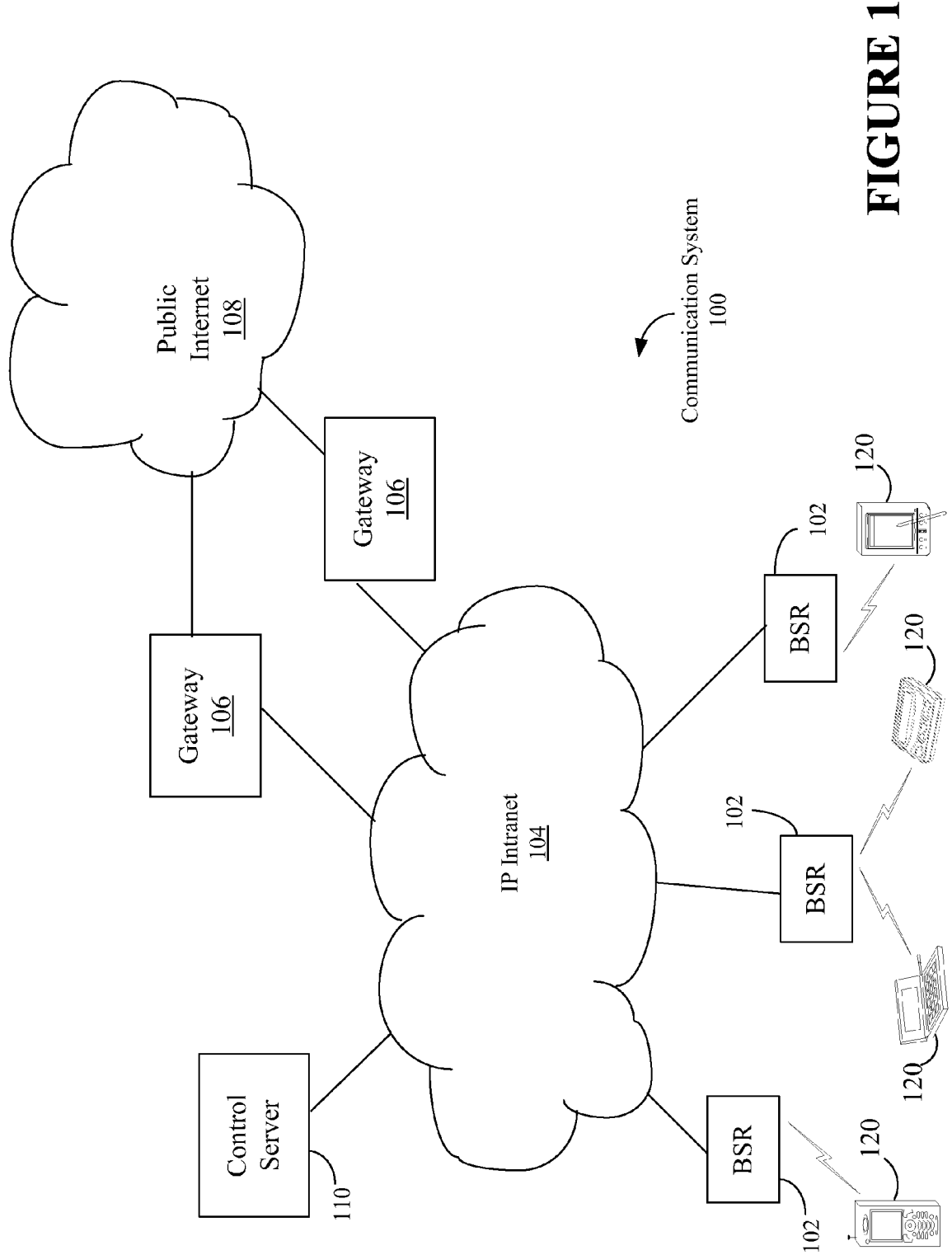
FIG. 1 stylistically depicts an exemplary wireless telecommunications system that uses Base Station Routers (BSRs) over which efficient multicasting may take place.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 employing an exemplary all-Internet Protocol (all-IP) network architecture is stylistically illustrated, in accordance with one embodiment of the present invention. Generally, the system 100 is comprised of a plurality of BSRs 102. The BSRs 102 are connected to an Intranet 104 (also referred to as the backhaul network). Gateways 106 connect the Intranet 104 to the Internet 108. In an exemplary embodiment of the instant invention, Internet Protocol (IP) is a network protocol that may be used to transport user and control information within the Intranet 104. A control server 110 provides call service control. One significant characteristic of the exemplary communications system 100 is that a substantial portion of the radio network functionalities are integrated with the base station functionalities, and are thus distributed across the network.

Third generation CDMA cellular networks are designed to support both voice and data services. Enhancements to packet data transport through high-speed shared channels (HSDPA in UMTS, EV-DV in CDMA 2000) are currently being standardized. In these systems, voice traffic is carried in traditional circuit-switched mode while data is carried through scheduled-mode shared channels in the form of packet switching. However, to provide a rich multimedia session, it is beneficial to have a single mode of transport for all services. This simplifies call control and reduces equipment cost for supporting multimedia user experience. Thus, for purposes of illustration, the instant invention is described in the context of a CDMA system that supports a shared transport channel, such as in the CDMA 2000 1x EV-DO system, as the wireless interface. Those skilled in the art will appreciate that aspects of the instant invention may be implemented in other types of communications systems without departing from the spirit and scope of the instant invention. Those skilled in the art will further appreciate that, whatever system is chosen to implement aspects of the instant invention, it would be useful for such a system to be capable of delivering the quality of service (QoS) required to carry multicast data.

Multicasting may be efficiently achieved in the wireless system of FIG. 1 by use of one or more aspects of the instant invention. Generally, there are two issues that are addressed to implement multicasting. First, a method of identifying multicast services within an HSDPA environment is provided. For example, a suitable mechanism for adding a requested user to multicast list for a given service that can be supplied by the cell in question is provided, and a suitable mechanism for identifying the multicast packet on the HS-DSCH is also provided. Second, a method for dealing with the H-ARQ and CQI processes arising from UE behavior is also provided.

Figure 2:
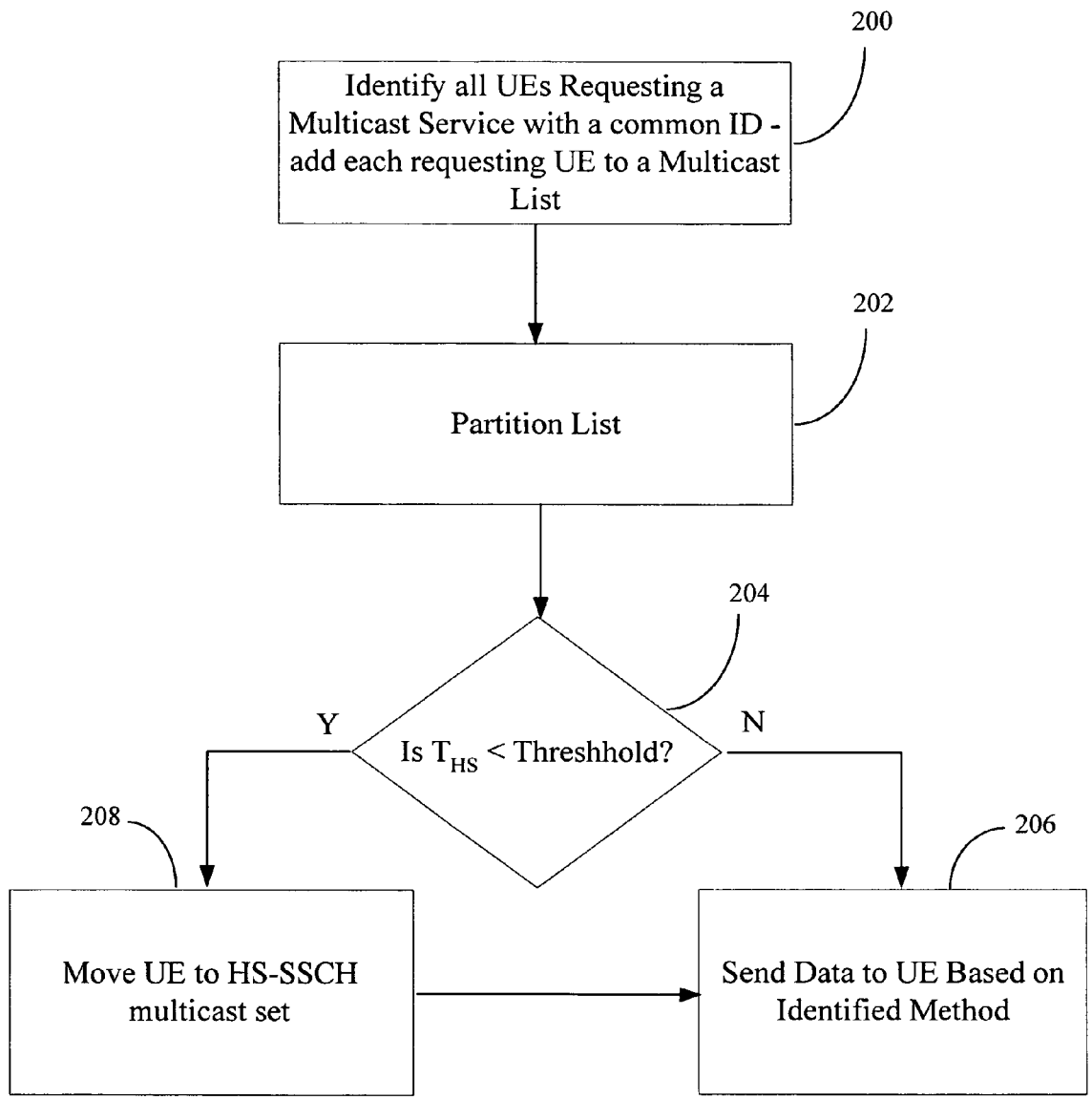
FIG. 2 stylistically depicts a flowchart representation of a method for assigning and admitting a mobile to a multicast group and also shows a mechanism for selecting the appropriate multicast transmission group.
Figure 3A:
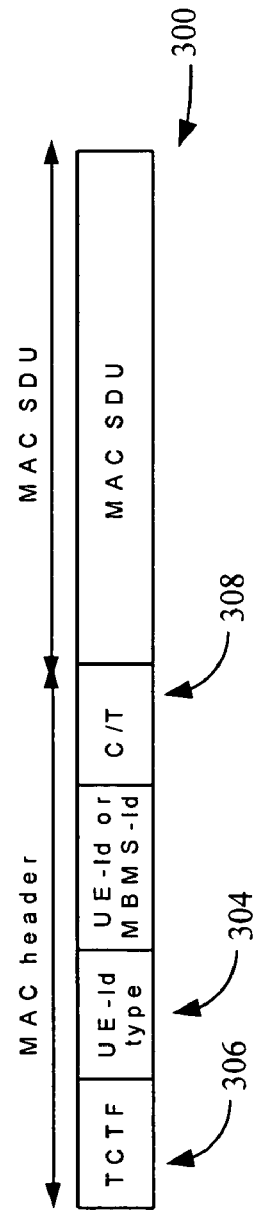
FIG. 3A stylistically depicts a Mac-d packet format.

Generally, for the supply of multicast services over the HS-DSCH, certain assumptions are made as to the format and behavior of the transmitting (Node B) and receiving (UE) sides in relation to the transmitted MAC packet format. In one embodiment of the instant invention, there is a mechanism for identifying each UE 120 that is requesting a multicast service. Turning to FIG. 2, one embodiment of a flowchart representation of a process that may be implemented in the BSR or Node B 102 is shown. The process begins at block 200 where each of the UEs 120 in a group of UEs requesting the same multicast program is identified by a single mobile UE ID. Thus, the current requesting UE 120 is added to a multicast list. At block 202, the list is partitioned into those UEs 120 that are HSPDA serviced (there may be a number of programs in a cell) and those UEs 120 that are unicast serviced. At block 204, those UEs whose long term BLock Error Rate(BLER) is below an HSDPA acceptance threshold ($T_{HS}$) are then added to the HS-DSCH multicast service set, while those UEs whose long term BLER is above $T_{HS}$ are monitored but are supplied by multicast over HSDPA at a lower data rate or over a Dedicated Channel (DTCH) or Forward Access CHannel (FACH) (whichever is desired) at block 206. If the BLER of an individual UE 120 improves to below $T_{HS}$, then the user may be transferred from the DTCH or FACH multicast set to the to the HS-DSCH multicast set at block 208. Also, the user may be transferred to another multicast group being served by HSDPA at a higher data rate. Those UEs 120 whose long term BLER is above $T_{HS}$ are monitored but are supplied by multicast over HS-DSCH, but with lower guaranteed data rate Once identified for HS-DSCH multicasting, a MAC-d header 300 (see FIG. 3A) that is commonly used for multicast service is altered appropriately. In particular, normally the multicast service is identified in the MAC-d header via four bits that indicate one of 16 possible services (see TS 25.321 (650), section 9.2.1). The UE-ID type 304 in the MAC-d header 300 is either selected to UTRAN Radio Network Temporary Identity (U-RNTI) or Cell RNTI (C-RNTI) and encoded appropriately (e.g., 00|01). The UE-ID type 304 may then be modified. If the UE-ID type 304 is equal to the U-RNTI, then set.

$b_{13}$-$b_0$=user-id
$b_{27}$-$b_{14}$=0
$b_{31}$-$b_{28}$=multicast identifier The U-RNTI is 32 bits in length ($b_{31}$-$b_0$). For BSR operation, the bottom 14 bits are used for the user-id ($b_{13}$-$b_0$ of the U-RNTI). This leaves bits $b_{31}$-$b_{14}$ for BSR-ID which for multicast in a BSR environment is not required. Therefore the bits $b_{31}$-$b_{28}$ can be used for multicast service identification and the remaining bits ($b_{27}$-$b_{14}$) may be all set to zero.

Alternatively, if the UE-ID type=C-RNTI, then set:
$b_1$-$b_0$=0
$b_{15}$-$b_{12}$=multicast identifier The C-RNTI is 16 bits in length ($b_{15}$-$b_0$) and is unique to a cell. The preference is to operate with C-RNTI, as this simplifies the management of the multicast service greatly since multicast services can be identified homogenously over many cells but managed separately on a per cell basis.

In both cases, the most significant bits are set to the multicast identifier, and if the bits are read from the most significant end then the multicast identifier should always follow the UE-ID type.

Those skilled in the art will appreciate that he TCTF 306 can be ignored, as it only applies to FACH and RACH channels. The C/T field 308 has to be set appropriately, i.e. must align with a logical channel identifier that has already been used for the multicast service.

Figure 3B:
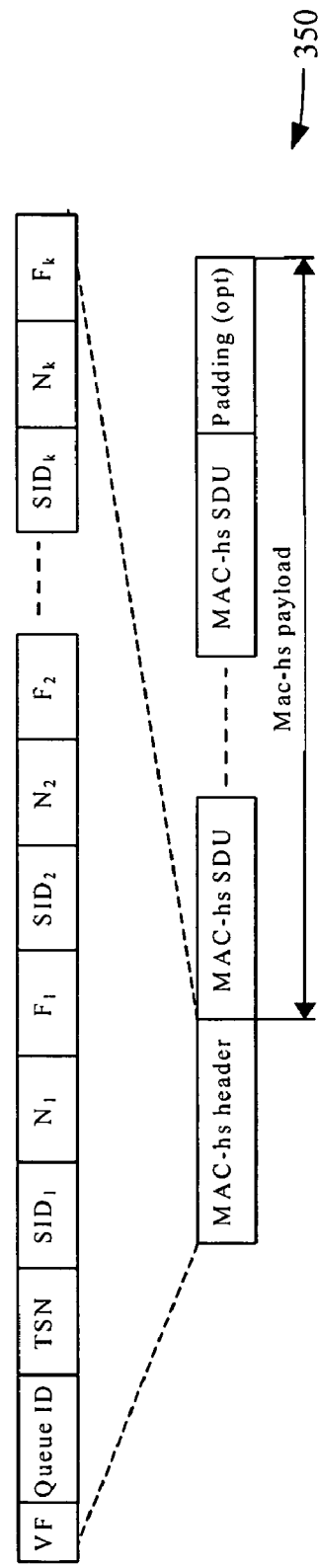
FIG. 3B stylistically depicts a MAC-HS packet format.

The modified MAC-d packet 300 is then placed within the MAC-HS packet 350 (see FIG. 3B) in the same manner as a normal MAC-d packet. The caveat here is that the Queue ID may have to be set homogenously across all the UEs 120 in the same multicast service group. In one embodiment of the instant invention, the MAC-HS packet has a format as set forth in FIG. 2B.

Those skilled in the art will appreciate that the identification of the multicast service does not necessarily rely on the MBMS standard for functionality and in reality MBMS services can be supplied over unmodified HSDPA terminals.

There are two items of information that this solution requires: the H-ARQ ACK/NACK, which is repetition encoded over 10 bits, and the channel CQI information, which is encoded by a (20,5) linear combination code, and the eventual CQI value is compensated for the UE class. Details on the encoding and general methodology may be found, for example, at TS25.214 section 6 and TS25.212 section 4.7.

The CQI measurement governs the transport format (TF) that is chosen. This means that because of compensations performed on the reported CQI value, the chosen TF for multicast transmission need not be optimal, as in reality it may be an effective common denominator among those in the chosen multicast service. In short, for certain UEs in the multicast set, the TFI may lead to more reported errors, i.e., the H-ARQ reports a NACK. Because of this, the overall performance of the multicast service on HS-DSCH will become poor. However if the compensations made to the CQI value are taken into account, then a majority voting scheme can be employed to control the H-ARQ process for a multicast channel supplied over the HS-DSCH and keep the multicast performance over HS-DSCH relatively high.

Therefore, given that the UE 120 is receiving multicast packets over the HS-DSCH in the manner indicated in the previous section, the behavior of the UE 120 should now be considered. The probability of error ($P_e(.)$) among the UEs receiving HS-DSCH multicast transmissions could be considered IDD therefore $P_e(UE_1)=P_e(UE_2)=P_e(UE_3)$. However because of the UE category (see TS25.214 section 6) this is not the case and in actual fact $P_e(UE_1) \approx P_e(UE_2) \approx P_e(UE_3)$. In reality, the UEs are partitioned into classes that define the error capability of the terminal. So, in one embodiment of the instant invention, the UEs are defined to belong to a class $C_{(x)}$ where the (x) denotes the class type, $UE_i^{(n)} \subset \{C_n\}$, i=1K m, n=1K k, where there are m UEs in the class and there are k classes.

The probability of error is then the same over all UEs of the same class, $P_e(UE_1^{(k)})=P_e(UE_2^{(k)})=\Lambda=P_e(UE_m^{(k)})$. The actual error can then be thought of in the following way, that the probability of error is a function of the UE class, $P_e(f^{(k)}(UE_i^{(k)}))$. In short, the probability of error depends on a statistical error function that is tailored to the class of UE to which the UE actually belongs. Since the error probability is the same over all UEs of the same class, then there is implied a weight that is associated with the error function, $P_e(f^{(k)}(UE_i^{(k)})) \Rightarrow w^k P_e(UE_i^{(k)})$. In short, the $w^k$ is a short-hand crib that is bounded in interval 0-1 acts as a constant multiplier to the UE error, which can be determined empirically.

Thus, for HS-DSCH retransmissions the following scenarios exist. For a single UE, if the feedback information is incorrect, then a retransmission is implied, i.e. a NACK, $P_e(UE_i^k) \alpha$ Nack. This is the simple case with only a single user in the system, then the shared channel operating in a multicast mode need only consider the single feedback channel. However where two users are in the system, then both or either of the UEs being in error will result in a NACK and lead to a subsequent transmission, $P_e(UE_1^k)+P_e(UE_2^k) \alpha$ Nack. This can be extended to a general case $$\sum_{i \in \{N\}} P_e(UE_i^k) \geq T\alpha Nack,$$

where there is number of UEs indexed i drawn from a total sample set N, and the UE can belong to any class k drawn from K, then if the sum of all errors is greater than a threshold T, then the system will interpret this as a NACK and retransmit the packet.

This is a simple voting mechanism that can decide on the multicast retransmission. However because it does not take into account the CQI information, then the voting may be skewed and result in over retransmissions. One modification to this would then be:

$$\sum_{i \in \{N\}} w^k P_e(UE_i^k) \geq T\alpha Nack,$$

where the UE class weight is used to modify the vote and eliminate the skew. In short, low data rate UE's have been compensated with more reliable CQI because lower data rates afford more protection in coding.

The users in the HS-DSCH multicast list may be viewed as forming a continuing sample matrix $S_T$. For ease of notation, $s_{i,t}^{(k)} = P_e(UE_{i,t}^{(k)})$, where s denotes the error sample (ACK/NACK), i is the UE index and t is the sample number and k is the UE class (category). The continuing sample matrix is then:

$$S_T = \begin{bmatrix} w^k s_{1,1}^k & \Lambda & w^k s_{1,t}^k \Lambda & w^k s_{1,t+n}^k \Lambda \\ M & O & M & M \\ w^\varepsilon s_{m,1}^\varepsilon & \Lambda & w^\varepsilon s_{m,t}^\varepsilon \Lambda & w^\varepsilon s_{m,t+n}^\varepsilon \Lambda \end{bmatrix}.$$

The column vectors $$V_t, V_t = \begin{bmatrix} w^k s_{1,t+n}^k \\ M \\ w^\varepsilon s_{m,t+n}^\varepsilon \end{bmatrix},$$

becomes the voting component at sample time t and the multicast retransmission decision becomes $$V = \sum_{i=1}^m w^k s_{i,t}^k,$$

$\forall k \in K$, $V > T\alpha$ NACK, $V \leq T\alpha$ ACK. However, in some embodiments of the instant invention, it may be useful to take the long term behavior of the UE into account. If the UE continually reports NACKS, then this would properly skew the multicast retransmission decision. Here properly means correctly—even with compensation. In this event, the errant UE may be removed from the sample matrix $S_T$. Removal of the errant UE may be effectively accomplished by setting its samples to 0 and therefore registering a "no" vote. As UE behavior becomes better in terms of NACK reporting then the real value is once again permitted to join the $S_T$ matrix.

To track the UE's suitability for inclusion or exclusion from $S_T$, a simple moving window averaging process is applied to the row vector of $S_T$ for the appropriate UE, i.e.

For a window size p, the UE average error, $\bar{\varepsilon}$, can be continually tracked, $$\bar{\varepsilon}_i^k = \frac{1}{p}\sum_{i=1}^{p} w^k s_{1,t-i}^k.$$

As this is a moving average process, a new error estimate can be obtained at each sample time, which also forms a random variable. Standard statistical techniques can be applied to this estimator to this random variable to improve the estimator's reliability through unbiasing. In any event, there will exist a reliable estimator for the error, E. If $E_i^k > T_{HS}\alpha$ Drop from $S_T$, $E_i^k \leq T_{HS}\alpha$ Add to $S_T$. Naturally other statistical techniques could be applied, such as considerations on the variance, in order to improve the decision.

The overall algorithm can then be summarized as follows:

```
for each sample t in S_T do
    for each user i in HS-DSCH-multicast-list
        if E_i>T_HS then
            remove user i from HS-DSCH-multicast-service set
        else
            if user i not in HS-DSCH-multicast-service set then
                add user i to HS-DSCH-multicast-service set
            end if
        end if
    end for
    //S_T should be full with valid UE's
    obtain V_t from S_T
    vote=0;
    for each user i in Vt
        vote +=V_t[i]
    end for
    if vote>T then
        retransmit multicast packet
    Else
        transmit next multicast packet
    end if
    //multicast to remaining UE's in multicast list
    for each user i not in HS-DSCH-multicast-service set
        (re)transmit next multicast packet
    end for
end for
```

Implementation of the instant invention produces significant advantages. For example, the modifications to the MAC-d packet for multicast use within the MAC-hs packet permits multicast use via HSDPA without other terminal modifications, and without the need for new handsets over and above handsets that support HSDPA. The instant invention also enables multicast services to perform better via considerations on the UE category for retransmission purposes, and it provides a means to dynamically add terminals to the HSDPA multicast services should the individual terminal channel quality improve.

The instant invention permits multicast services to be effectively supplied over an HSDPA channel. This has the dual benefit of optimizing the resources available for multicast both from a bit rate and channel utilization perspectives, in short it minimizes the number of channels required for multicast services within the cell, while at the same time permitting higher multicast bit rates to be used without using up valuable cell resources, such as power and channelization codes.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 220 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for providing a multicast service to a plurality of mobile devices, the method comprising:
    partitioning the plurality of mobile devices into a first portion and a second portion, the first portion having a first block error rate below a threshold and the second portion having a second block error rate above the threshold;
    multicasting the multicast service to the first portion of the plurality of mobile devices over a shared channel; and
    unicasting the multicast service to each mobile device in the second portion of the plurality of mobile devices over a channel dedicated to said each mobile device wherein unicasting the multicast service occurs substantially concurrently with multicasting the multicast service.

2. The method, as set forth in claim 1, wherein multicasting the multicast service to the first portion of the plurality of mobile devices further comprises generating a medium access control (MAC) header including information indicative of the multicast service.

3. The method, as set forth in claim 2, comprising appending the MAC header to data packets for multicasting to the first portion of the plurality of mobile devices over the shared channel.

4. The method, as set forth in claim 3, comprising multicasting data packets to the first portion of the plurality of mobile devices over the shared channel and receiving feedback information from the first portion in response to multicasting the data packets.

5. The method, as set forth in claim 4, comprising determining whether to retransmit the multicast data packets by applying a majority voting scheme to the received feedback information.

6. The method, as set forth in claim 5, wherein applying in the majority voting scheme comprises determining a probability that the received feedback information indicates that a retransmission of the data packets is implied.

7. The method, as set forth in claim 6, wherein determining the probability that the received feedback information implies a retransmission of the data packets comprises summing the probabilities that the feedback information received from each mobile device in the first portion implies the retransmission of the data packets.

8. The method, as set forth in claim 7, wherein determining the probability that the received feedback information implies the retransmission of the data packets comprises weighting the probabilities that the feedback information received from each mobile device in the first portion implies retransmission of the data packets and then summing the weighted probabilities.

9. The method, as set forth in claim 8, wherein weighting the probabilities comprises weighting the probabilities based upon channel quality information.

10. The method, as set forth in claim 9, comprising selecting a subset of the first portion for inclusion in the set of mobile devices used to determine the probability that the received feedback information implies the retransmission of the data packets.

11. The method, as set forth in claim 10, wherein selecting the subset comprises selecting the subset based upon a long-term average of the received feedback information from the mobile devices in the first portion.

12. The method, as set forth in claim 1, further comprising moving a mobile device from the first portion to the second portion of mobile devices in response to the block error rate of the mobile device falling below the threshold.

13. The method, as set forth in claim 1, further comprising moving a mobile device from the second portion to the first portion of mobile devices in response to the block error rate of the mobile device rising above the threshold.

* * * * *